(12) United States Patent
Li et al.

(10) Patent No.: US 11,707,744 B2
(45) Date of Patent: Jul. 25, 2023

(54) COOLED MOTOR FOR A PAPER SHREDDER

(71) Applicant: Aurora Office Equipment Co., Ltd. Shanghai, Shanghai (CN)

(72) Inventors: Kiapin Li, Shanghai (CN); Zhankai Yang, Shanghai (CN); Yung Kang Tso, Shanghai (CN); Bin Zhang, Shanghai (CN)

(73) Assignee: Aurora Office Equipment Co., Ltd. Shanghai, Shanghai (CN)

( * ) Notice: Subject to any disclaimer, the term of this patent is extended or adjusted under 35 U.S.C. 154(b) by 251 days.

(21) Appl. No.: 17/074,552

(22) Filed: Oct. 19, 2020

(65) Prior Publication Data

US 2021/0031207 A1   Feb. 4, 2021

Related U.S. Application Data

(60) Division of application No. 14/725,329, filed on May 29, 2015, now Pat. No. 10,814,332, which is a continuation of application No. 13/770,233, filed on Feb. 19, 2013, now Pat. No. 9,088,183.

(51) Int. Cl.
*B02C 18/00* (2006.01)
*H02K 9/04* (2006.01)
*B02C 18/16* (2006.01)
*H02K 9/06* (2006.01)

(52) U.S. Cl.
CPC .......... *B02C 18/0007* (2013.01); *B02C 18/16* (2013.01); *H02K 9/04* (2013.01); *H02K 9/06* (2013.01); *B02C 2018/0038* (2013.01)

(58) Field of Classification Search
CPC ..... B02C 18/0007; B02C 18/16; B02C 18/18; H02K 9/04; H02K 9/06
See application file for complete search history.

(56) References Cited

U.S. PATENT DOCUMENTS

| 9,553,492 B2* | 1/2017 | Xu .......................... B02C 18/16 |
| 2004/0188553 A1* | 9/2004 | Lo .......................... B02C 18/148 241/36 |
| 2006/0172686 A1* | 8/2006 | Ho .......................... F04D 25/02 454/228 |

(Continued)

FOREIGN PATENT DOCUMENTS

JP           2004050164 A  *  2/2004  ............. B02C 18/24

*Primary Examiner* — Faye Francis
(74) *Attorney, Agent, or Firm* — WHGC, P.L.C.; John F. O'Rourke; Alexander R. Schlee

(57) ABSTRACT

A paper shredder motor cooling assembly having a paper shredder motor coupled to a fan shaft, an enclosure surrounding the paper shredder motor and having selected input and selected output vents to control airflow to the paper shredder motor, a fan coupled to the fan shaft, communicating with the selected input vents or the selected output vents; when the paper shredder motor is operating, the rotor shaft turns the fan to generate a differential air pressure between the selected input vents and the selected output vents, removing heat from the motor. A duty cycle of greater than 50% is obtained. The fan can be coupled to the motor by speed increasing gearing, attached to the cutter blade assembly, such that the fan turns faster than the motor. The fan also can be attached to the motor shaft. An input fan and an output fan can be used.

6 Claims, 10 Drawing Sheets

(56) References Cited

U.S. PATENT DOCUMENTS

| | | | |
|---|---|---|---|
| 2008/0092561 A1* | 4/2008 | Panuccio | A23B 7/04 |
| | | | 62/65 |
| 2012/0274256 A1* | 11/2012 | O'Rourke | H02K 9/06 |
| | | | 318/473 |
| 2015/0258550 A1* | 9/2015 | Li | B02C 18/16 |
| | | | 310/59 |

* cited by examiner

COOLED MOTOR FOR A PAPER SHREDDER

CROSS REFERENCE TO RELATED APPLICATIONS

The present U.S. patent application, is a non-provisional application related to a co-pending sibling divisional application Ser. No. 17/074,576, both entitled "COOLED MOTOR FOR A PAPER SHREDDER," both filed on even date herewith, and the present application is a divisional application of U.S. application Ser. No. 14/725,329, entitled "COOLED MOTOR FOR A PAPER SHREDDER," filed May 29, 2015, which is U.S. Pat. No. 10,814,332 issued Oct. 27, 2020, which is a continuation of U.S. application Ser. No. 13/770,233, entitled "COOLED MOTOR FOR A PAPER SHREDDER" filed Feb. 19, 2013, which is U.S. Pat. No. 9,088,103, issued Jul. 21, 2015, which applications are hereby incorporated by reference herein.

BACKGROUND

1. Field of the Invention

The present invention relates to electric motors and more particularly to paper shredders having electric motors with cooling apparatus.

2. Background Art

Consumer product satisfaction is driven at a particular product price point by product safety, product reliability, and product longevity. This is particularly so in the field of consumer paper shredders, where a shredder can endure excessive or rough wear despite the non-industrial focus of the shredder product specifications. Such excessive or rough wear can, over time, degrade the reliability and longevity of the shredder product causing the consumer to become dissatisfied with the product. In some cases, repeated stresses on the moving parts of the shredder may cause part failure, leading to the expense of product repair or replacement, a further decrease in satisfaction, or even loss of goodwill for the respective consumer in the paper shredder brand. Even marginally stressful moments of operation may in the aggregate take their toll on the operating machinery of the shredder.

One shredder part which can be vulnerable to mechanical and thermal stresses is the shredder electric motor, which can arise from, for example, frequent starting, overloading, jamming, and continuous, beyond-rating use. Over time, the cumulative stresses faced by a shredder motor may lead to premature failure or poor performance. A common thread with these stressors is the heating effects of motor current ($I^2R$ losses). Many sophisticated electronic controllers have been devised to reduce the effects of $I^2R$ losses upon motors. Complex mechanical cooling systems have been advanced for large motors, as well. However, in the sphere of fractional-horsepower electric motors, as used in light- to medium-duty paper shredders, sophisticated electronic controllers and complex mechanical coolers can add prohibitive premiums to the motor cost, and to the cost to consumers, reducing a manufacturer's market share. An inexpensive but efficacious cooling apparatus for paper shredder motors is needed.

SUMMARY

The foregoing need is met by cooling apparatus and methods for a motor for a paper shredder. A paper shredder motor cooling assembly includes a paper shredder motor coupled to a fan shaft; an enclosure surrounding the paper shredder motor and having selected input and selected output vents disposed to control airflow to the paper shredder motor; and a fan coupled to the fan shaft and in communication with the selected input vents or the selected output vents. When the paper shredder motor is operating, the rotor shaft turns the fan to generate a differential air pressure between the selected input vents and the selected output vents, and heat is removed from the motor. A duty cycle of greater than 50% is obtained thereby. In one embodiment, the fan is an input fan, insufflating air into the input vents and across the motor. In another embodiment, the fan is an output fan, extracting air through the output vents and across the motor. In yet another embodiment, there is an input fan and an output fan, each coupled to the rotor shaft and in respective communication with the input vents and the output vents.

In still another embodiment, the paper shredder motor cooling assembly further includes a reduction gearing coupled to the paper shredder motor; a shredder blade shaft coupled to the reduction gearing; a speed increasing gearing coupled to the shredder blade shaft; and the fan shaft is coupled to the speed increasing gearing, wherein the rotational speed of the fan is greater than the rotational speed of the paper shredder motor. A fan tube can be disposed between the fan and the selected motor inlet vents, in which the fan tube is directing a forced air current to the motor from the fan.

In yet other embodiments, a paper shredder is provided including a cutting blade assembly having a shredder blade shaft; a motor having a rotor coupled to the cutting blade assembly; an enclosure enclosing the motor, and a fan assembly coupled to the rotor, disposed at an end of the enclosure. The enclosure has first selected vent holes defining an input air path on one end and second selected vent holes defining an output air path on the other end. The fan assembly is in confined communication with the vent holes, such that, when the motor is operating, the cutting blade assembly is urged to comminute shreddant and the fan assembly creates a pressure differential between the input air path and the output air path. The pressure differential causes air to be forced across the motor such that the motor is cooled. Selected embodiments can have an air manifold opening coupled to the fan assembly such that the enclosure is coupled to one of the input air path or the output air path, and where the air manifold opening is in communication with the exterior of a paper shredder. In selected other embodiments, an intake air manifold opening is coupled to the input air path and an output air manifold opening is coupled to the output air path, wherein the air manifold openings are in communication with the exterior of a paper shredder. The enclosure end can have vent holes defining an input air path is coupled to the fan assembly. The enclosure end having vent holes defining an output air path is coupled to the fan assembly. In one configuration, the first enclosure end has selected input vent holes insufflating the motor through an input air path having an input fan. In another, the second enclosure end has selected output vent holes exhausting the motor through an output air path having an output fan. Yet, in another having an input fan, the second enclosure end has selected vent holes defining an output air path is coupled to a second fan assembly. In certain embodiments, the fan assembly further includes a cooling fan blade; a tube disposed between the cooling fan blade and an end of the enclosure; a fan blade rotor affixed to the cooling fan blade; the fan blade rotor coupled to a speed increasing gear assembly; and the speed increasing gear assembly coupled to the shredder blade shaft. Here, when the motor rotor turns at a first speed, the shredder blade shaft turns at a second speed, which speed increasing gear assembly turns the fan rotor at a third speed. The second speed is slower than the first speed and the third speed is faster than the first speed, and a forced air current is blown onto an end of the motor enclosure, cooling the motor.

The invention also includes embodiments of a paper shredder, which has a shredder enclosure; an air intake manifold formed into the shredder enclosure; a motor coupled to a shredder cutting blade assembly and to the air intake manifold; an intake fan disposed between air intake manifold and selected inlet vents on the shredder motor, operating to insufflate a high volume of air into the motor for cooling, wherein the fan is coupled to the motor. In some embodiments, the fan is directly coupled to the motor. In others, the fan is coupled by a speed increasing gearing to the motor. The paper shredder embodiments can include an air outlet manifold formed into the shredder enclosure and coupled to selected outlet vents on the motor, disposed to exhaust a high volume of air from the motor for cooling, wherein the inlet fan is affixed to a shaft of the motor. Some embodiments also include an outlet fan disposed between air outlet manifold and selected outlet vents on the shredder motor, disposed to exhaust a high volume of air from the motor for cooling, wherein the outlet fan is affixed to the shaft of the motor.

BRIEF DESCRIPTION OF THE DRAWINGS

Embodiments of the present invention disclosed herein are illustrated by way of example, and are not limited by the accompanying figures, in which like references indicate similar elements, and in which.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. In the figures, like numbers correspond to like elements.

DETAILED DESCRIPTION

Embodiments of the present invention can assist in reducing overheating in a motor. In particular, selected embodiments can be used as a forced-air cooled motor, as may be used without limitation, to power a home or office paper shredder.

Figure 1:
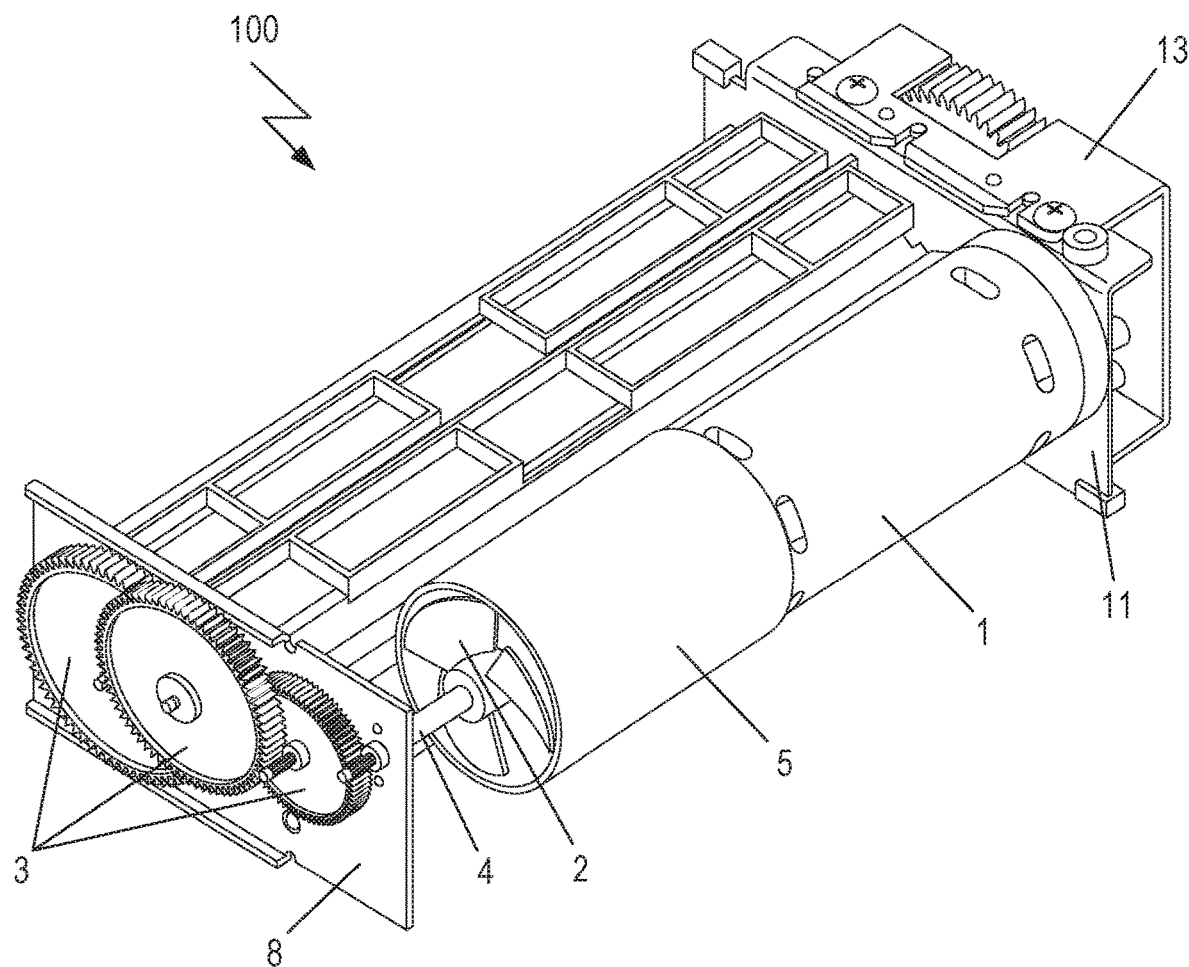
FIG. 1 is a perspective illustration of a shredder motor cooling apparatus including a fan cooler, in accordance with the teachings of the present invention.

FIG. 1 illustrates an embodiment of a shredder motor cooling apparatus having shredder assembly 100, including motor 1, cooling fan 2, overdrive gearing 3, fan shaft 4, fan tube 5, first side plate 8, second side plate 11, and shredder gearing housing 13. Perspective is that of first side plate 8 forward, with one of shredder gearing exposed through a slot in housing 13. Motor 1 is disposed between first side plate 8 and second side plate 11. Shredder gearing housing 13 is disposed over gears (seen in part) coupled to the shaft (not shown) of motor 1, and is disposed on the outer side of second side plate 11. Shredder gearing (not shown) is a reduction gearing, which also is coupled to shredder blade shaft (not shown). In assembly 100, overdrive gearing, which also can be speed increasing gearing, 3 is coupled to and motivated by the shredder blade shaft (not shown) and coupled to fan shaft 4. Fan shaft 4 couples the shaft rotation through first side plate 8 to cooling fan 2. Fan tube 5 may be fitted tightly to motor 1 end, which motor 1 end may have selected ventilation holes (not shown) to admit the cooling air. In operation, motor 1 operates shredder gearing (not shown), which is coupled to the shredder blade shaft (not shown). The shredder blade shaft (not shown) can be coupled to overdrive gearing 3. Overdrive gearing 3 may be configured to turn shaft 4 and thus, cooling fan 2, providing a rotation of between about 4,000 RPM to about 10,000 RPM. Such a high-speed rotation can create a forceful current of air by cooling fan 2, which can be confined by fan tube 5 and directed to cool motor 1. Such a fan configuration is capable of operating at a different speed from that of the motor 1, increasing cooling of motor 1 at a high thermal efficiency. Indeed, the produced efficiency may provide a shredder motor duty cycle of greater than 50%.

Figure 2:
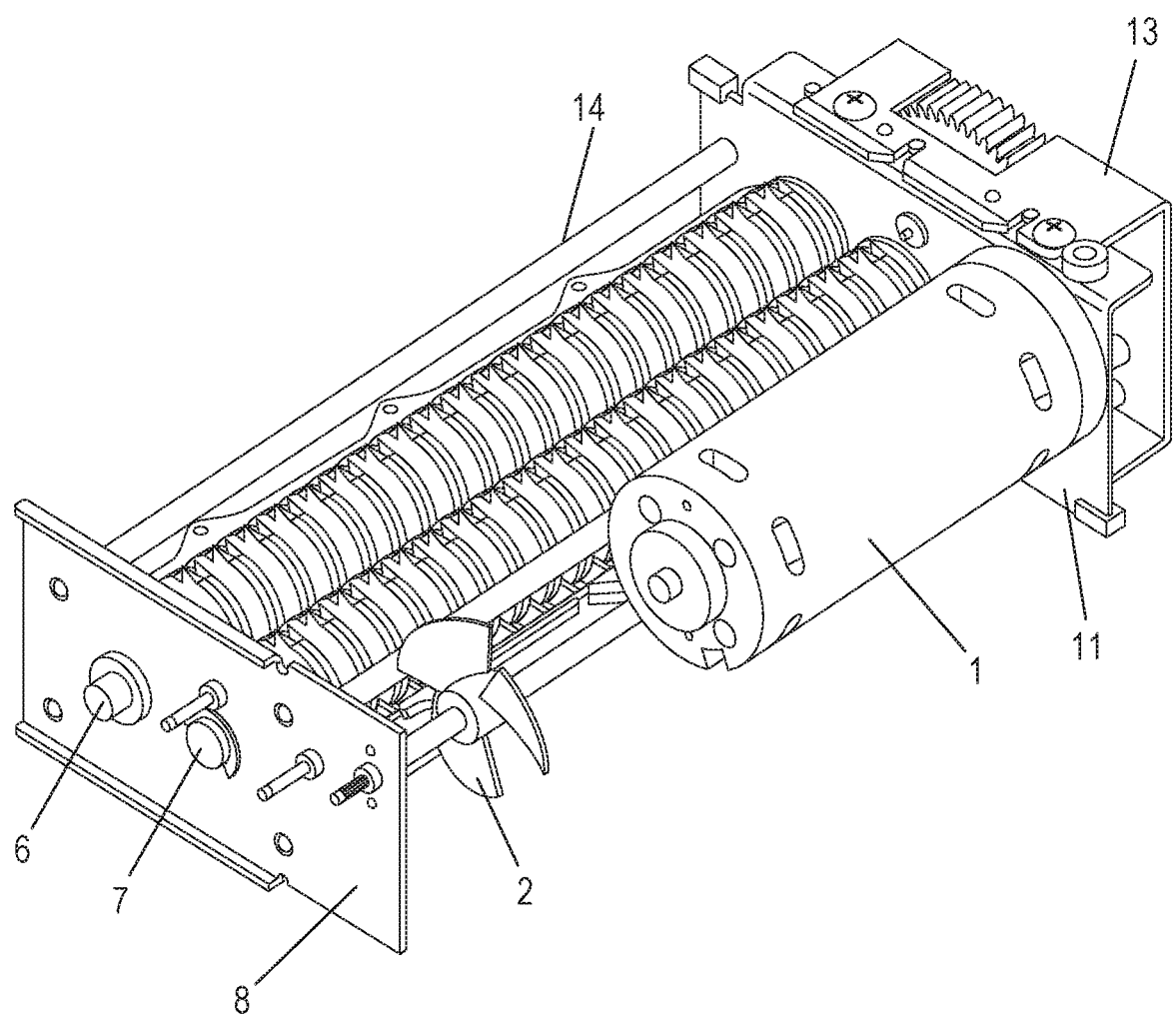
FIG. 2 is a perspective illustration of the shredder motor cooling apparatus of FIG. 1, having overdrive gearing removed, in accordance with the teachings of the present invention.
Figure 3:
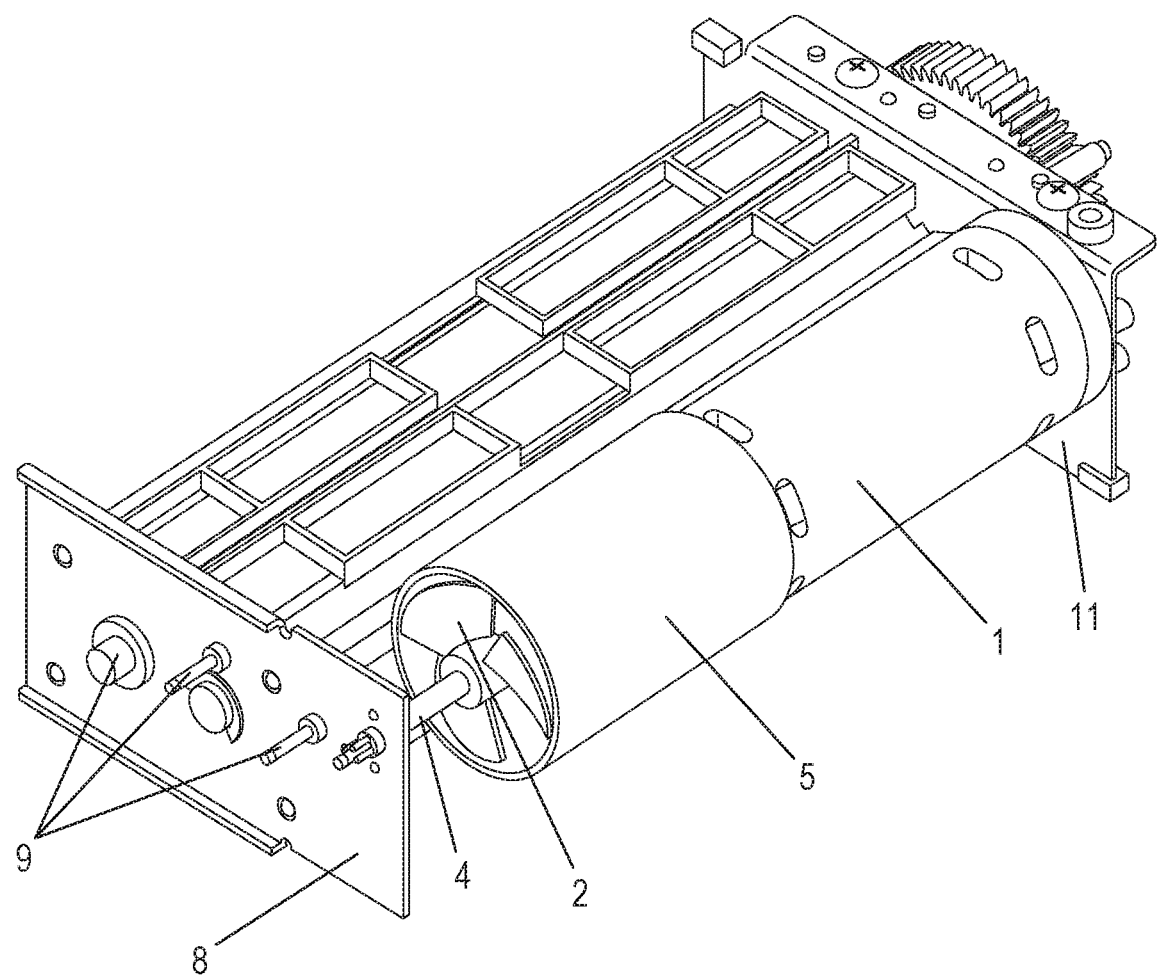
FIG. 3 is a perspective illustration of the shredder motor cooling apparatus of FIG. 1, having overdrive gearing removed, in accordance with the teachings of the present invention.

Referring to FIG. 2, shredder blade shaft assembly can be seen to include first driver shaft 7 and shredder blade shaft 6, both of which are motivated by shredder gearing 12, which is partially seen through cover 13. Shredder blades have been removed for clarity of presentation. Shredder blade shaft 6 can protrude through first side plate 8 and be coupled to overdrive gearing 3. Motor 1 can be affixed to second side plate 11 and coupled to shredder gearing (partially shown through cover 13). Stabilizing bar 14 is supportingly affixed between first side plate 8 and second side plate 11. With fan tube 5 removed, selected tube vent holes may be seen in the end of the can. Cooling fan 2 can be a simple axial fan, for low cost. In FIG. 3, shaft bushings 9 (bearings) are illustrated on the outer side of first side plate 8. Protective coverings are illustrated as being in place on the shredder blade assembly.

Figure 4:
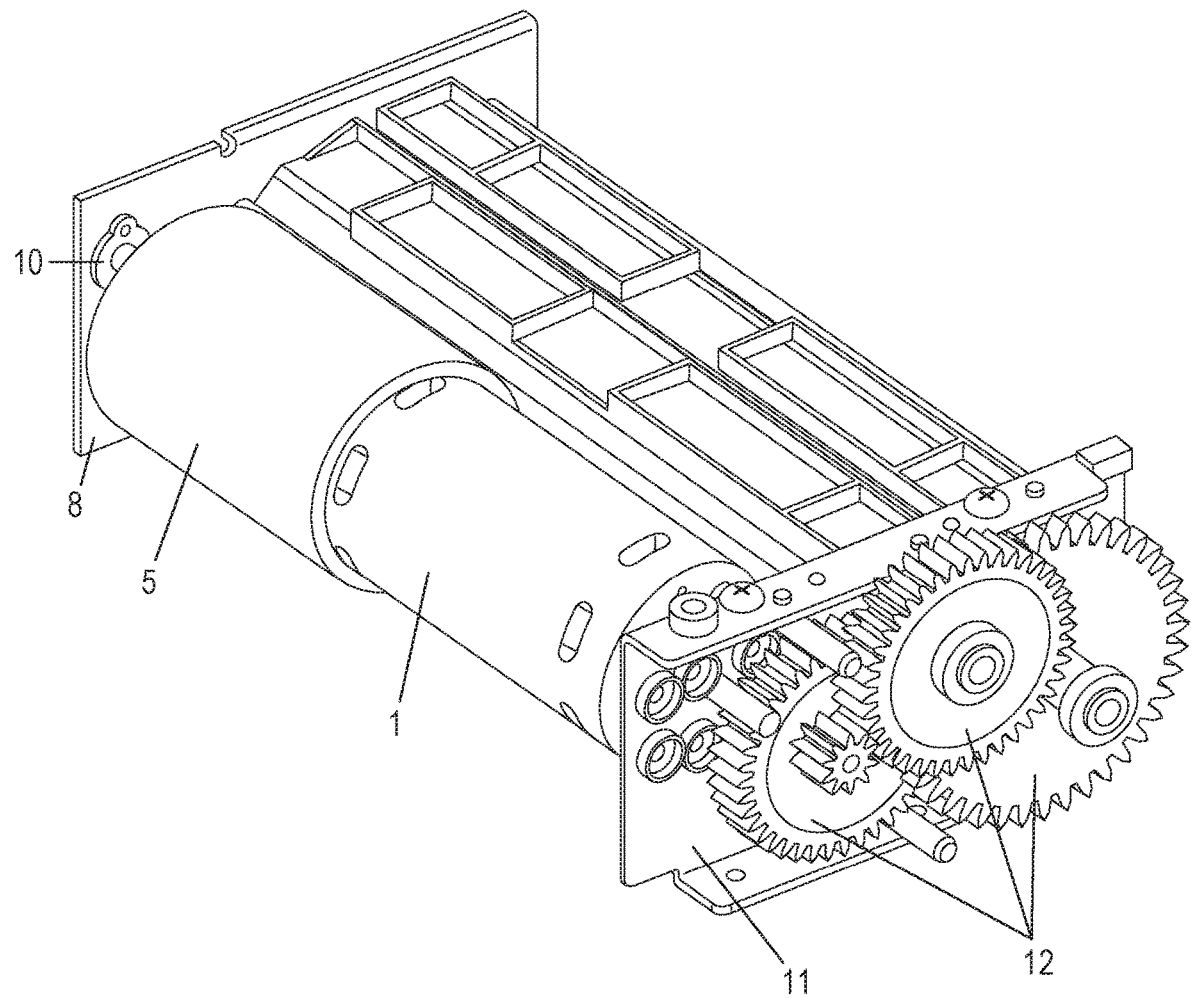
FIG. 4 is a perspective illustration of the shredder motor cooling apparatus of FIG. 1, with perspective of the opposite end of FIG. 1.

FIG. 4 present an shredder assembly 100 from the vantage of second side plate 11 forward, with shredder gearing housing 13 removed and shredder gearing 12 shown exposed. Protective coverings conceal the shredder blades in FIG. 4. Fan bezel 10 can be seen on the inner side of first side plate 8. Fan bezel 10 is sized to admit fan shaft 4 therethrough and may provide additional support to high revolution speed of cooling fan 2.

Figure 5:
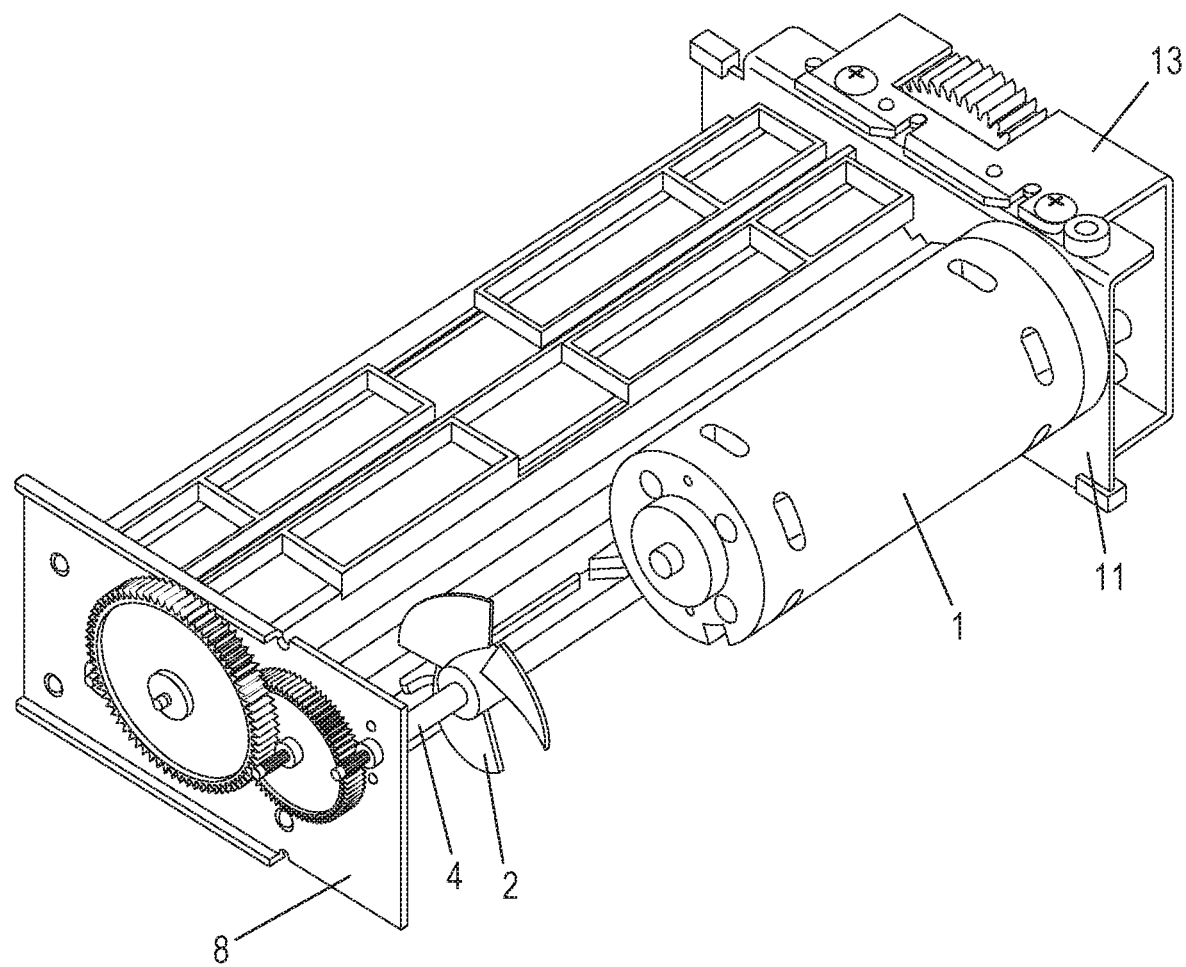
FIG. 5 is a perspective illustration of another embodiment of a shredder motor cooling apparatus including a fan cooler, in accordance with the teachings of the present invention.
Figure 6:
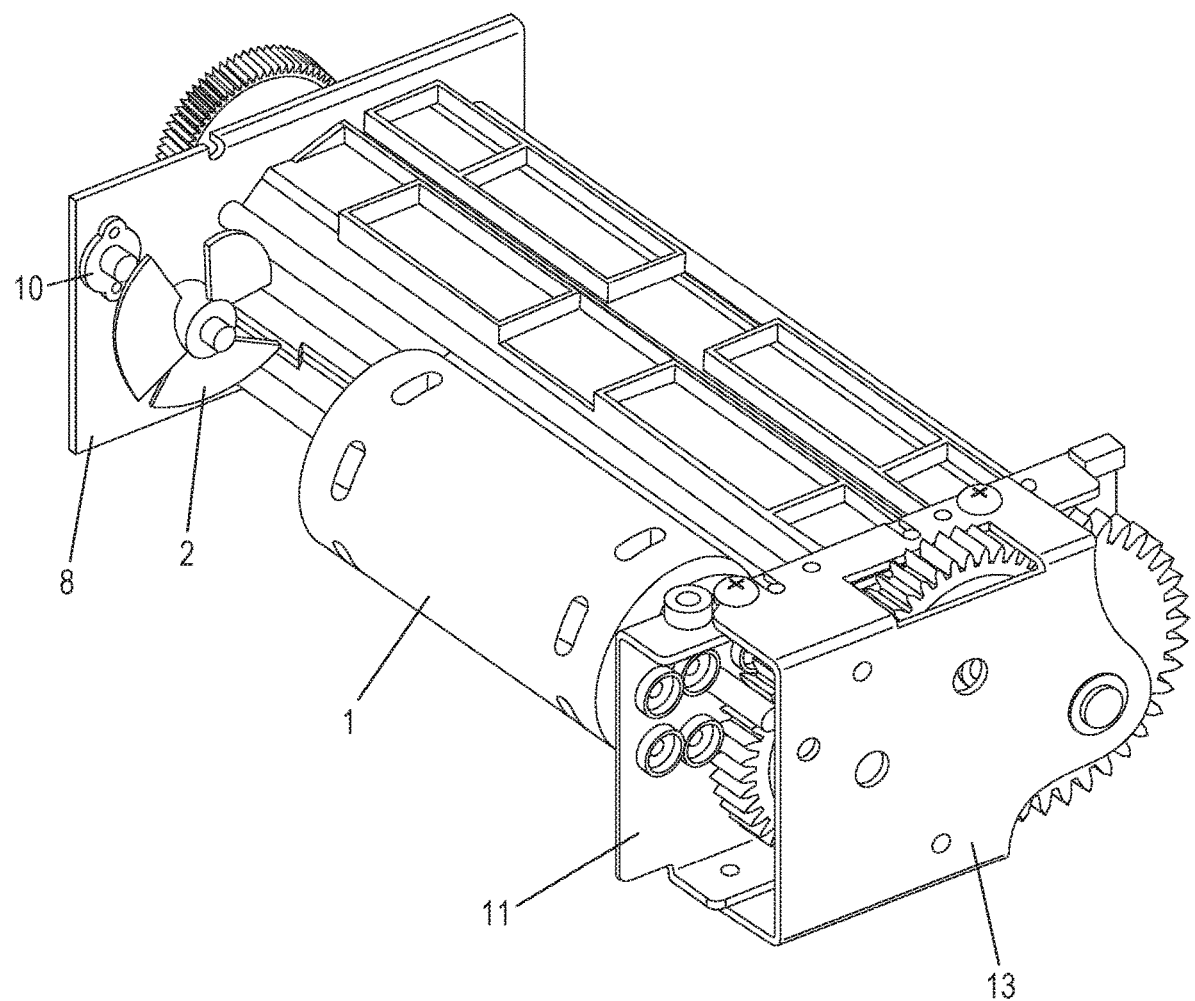
FIG. 6 is a perspective illustration of the embodiment shredder motor cooling apparatus of FIG. 5, with perspective of the opposite end of FIG. 5.

FIG. 5 is an embodiment of shredder assembly 200 with forced cooling by cooling fan 2, without containment by fan tube 5. The perspective is that of the first side plate 8 being forward. The operation and functionality of FIGS. 1-4 of shredder assembly 100 is substantially the same in shredder assembly 200 without confinement of the air current generated by cooling fan 2 within fan tube 5. FIG. 6 depicts shredder assembly 200 from the perspective of the second side plate 11 being forward and gearing housing 13 being in place.

Figure 7:
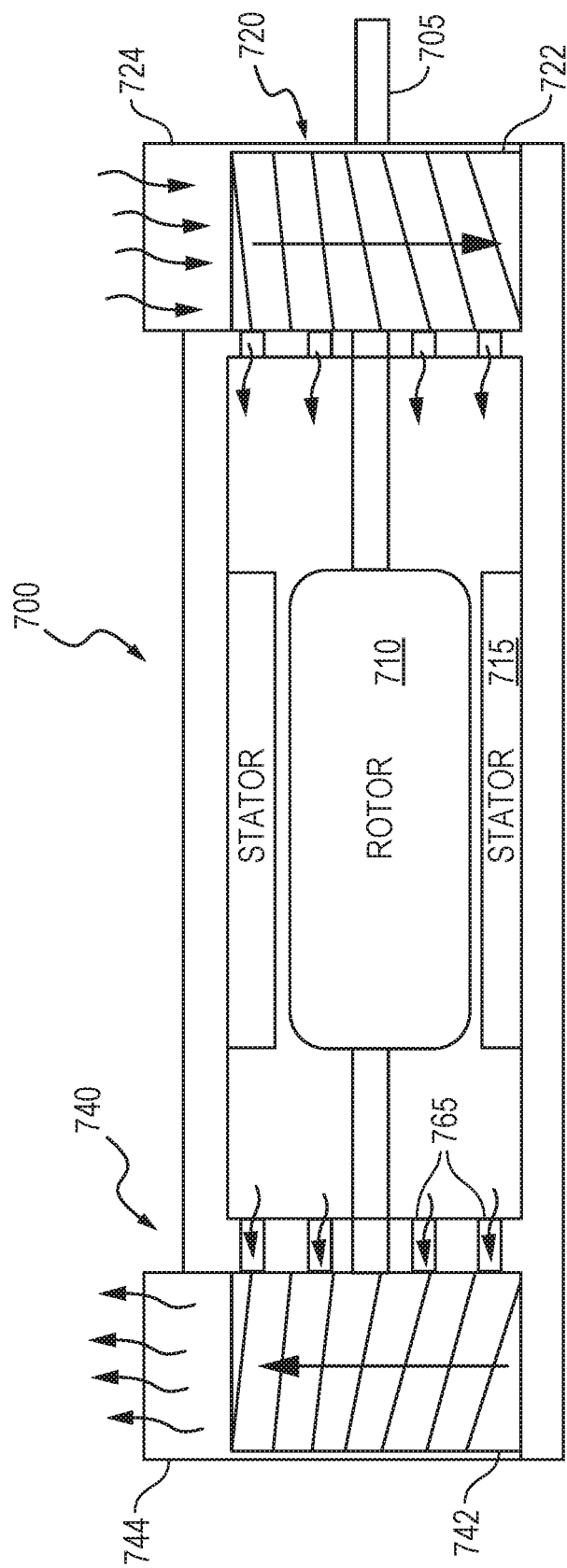
FIG. 7 is a graphical illustration of yet another embodiment of a shredder motor cooling apparatus using two fans, in accordance with the teachings of the present invention.

Turning to FIG. 7, still another embodiment of the present invention is depicted. Motor 700 combined with cooling fans 720, 740 is shown, in which each of cooling fans 720, 740 can be enclosed within motor air chamber 722, 742, respectively. Motor 700 can be confined to a sealed can 750, with limited paths for air flow with motor air chamber 722, 742, and creating a defined heat transfer path within motor 700. Cooling fan 720 is disposed to be a forced air intake fan 720 coupled to the shaft 705 of motor 700. Cooling fan 740 is disposed to be a forced air outlet fan 740 coupled to the shaft 705 of motor 700. Fans 720 and 740 are positioned in line with motor rotor 710. When power is applied to motor 700, rotor 710 rotates relative to stator 715 to translate mechanical power on shaft 705 from applied electrical energy. Fan 720 insufflates air for cooling across motor 700. Fan 740 extracts air for cooling across motor 700. Either fan 720, or fan 740, or both, may be used. A portion of the mechanical power applied to shaft 705 is employed by fans 720, 740. Fans 720, 740 tend to rotate at the speed of shaft 705, for example at about 3700 RPM. In selected embodiments, motor 700 with inlet fan 720 and outlet fan 740 generate an energetic stream of air directed from intake vent 724 to outlet vent 744, and through the region of rotor 710 and stator 715, when energized. Sealed can 750 can include vent holes 755, 765 disposed on outlet side 724 of intake fan 720, and disposed on intake side 744 of outlet fan 740, to provide directional flow of air. Such forced air flow can be effective in removing heat from rotor 710 and stator 715, increasing the duty cycle of motor 700 to nearly an order of magnitude greater than ordinary paper shredder motors, for example, up to about 45 minutes. In selected configurations, only one fan assembly may be used. In some configurations, a type of centrifugal fan can produce large volumes of air because of a forced pressure differential across motor 700 from intake fan 720 to outlet fan 740 created by at least one of fans 720, 740 and guided by selected flow holes 755, 765. A centrifugal fan may be used for fan 720 and fan 740, although fans 720, 740 are not confined to such configurations. In other configurations, an axial fan can be used. In yet other configurations, a vane-axial fan may be configured to produce an efficacious forced airflow by differential pressure. The heat removed from motor 700 is increased over present paper shredder motors due to the increased forced air mass flow rate passing by the motor elements. The configuration of FIG. 7 may be disposed within the interior of a paper shredder or in communication with the exterior of the paper shredder.

Figure 8:
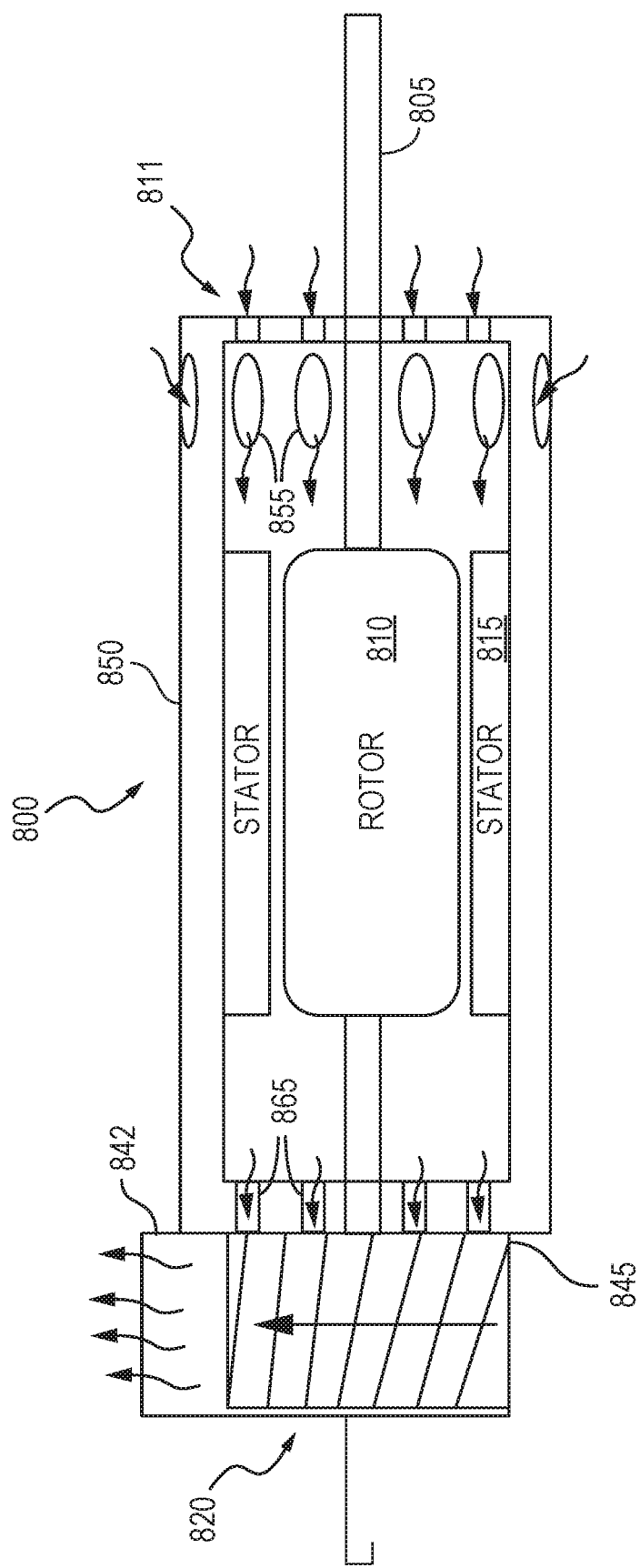
FIG. 8 is a graphical illustration of another embodiment of a shredder motor cooling apparatus using a single fan, in accordance with the teachings of the present invention.

FIG. 8 illustrates that effective cooling also may be obtained by using a single outlet fan 820 as a forced air outlet fan assembly for motor 800. As before, shaft 805 of rotor 810 can provide the mechanical motive force for fan 820, derived from the electromagnetic interaction of rotor 810 and stator 815. Motor 800 can be confined to an enclosure, e.g., a sealed can, 850 with limited paths for air flow and for creating a defined air flow and a heat transfer path within motor 800. Vent holes 855, 865 can be disposed to direct forced air flow from air intake side 811 to air outlet side 842. Vent holes 855 provide for input cooling air into motor 800 and manifold vent holes 865 provide for motor cooling air extraction into intake 845 of outlet fan 800. Fan 820 can be enclosed within motor air chamber 822, which can be communicatingly affixed to enclosure 850 to allow air flow through an end of the enclosure. A centrifugal fan in such embodiments also can produce large volumes of air because of a pressure differential across motor 800, created by fan 820 and by guided vents, or flow holes 855, 865, from air intake side 811 at one end of the enclosure to air outlet side 842 at the other end of the enclosure. However, and axial fan also may be used. This configuration may be disposed within the interior of a paper shredder or in communication with the exterior of the paper shredder. The heat removed from motor 800 is increased over present paper shredder motors due to the increased forced air mass flow rate passing by the motor elements. Neither FIG. 7 nor FIG. 8 require a separate controller or power supply for the forced air fans due to their integration with the shaft of the motor rotor. As with FIG. 7, an axial or a centrifugal fan assembly may be used.

Figure 9:
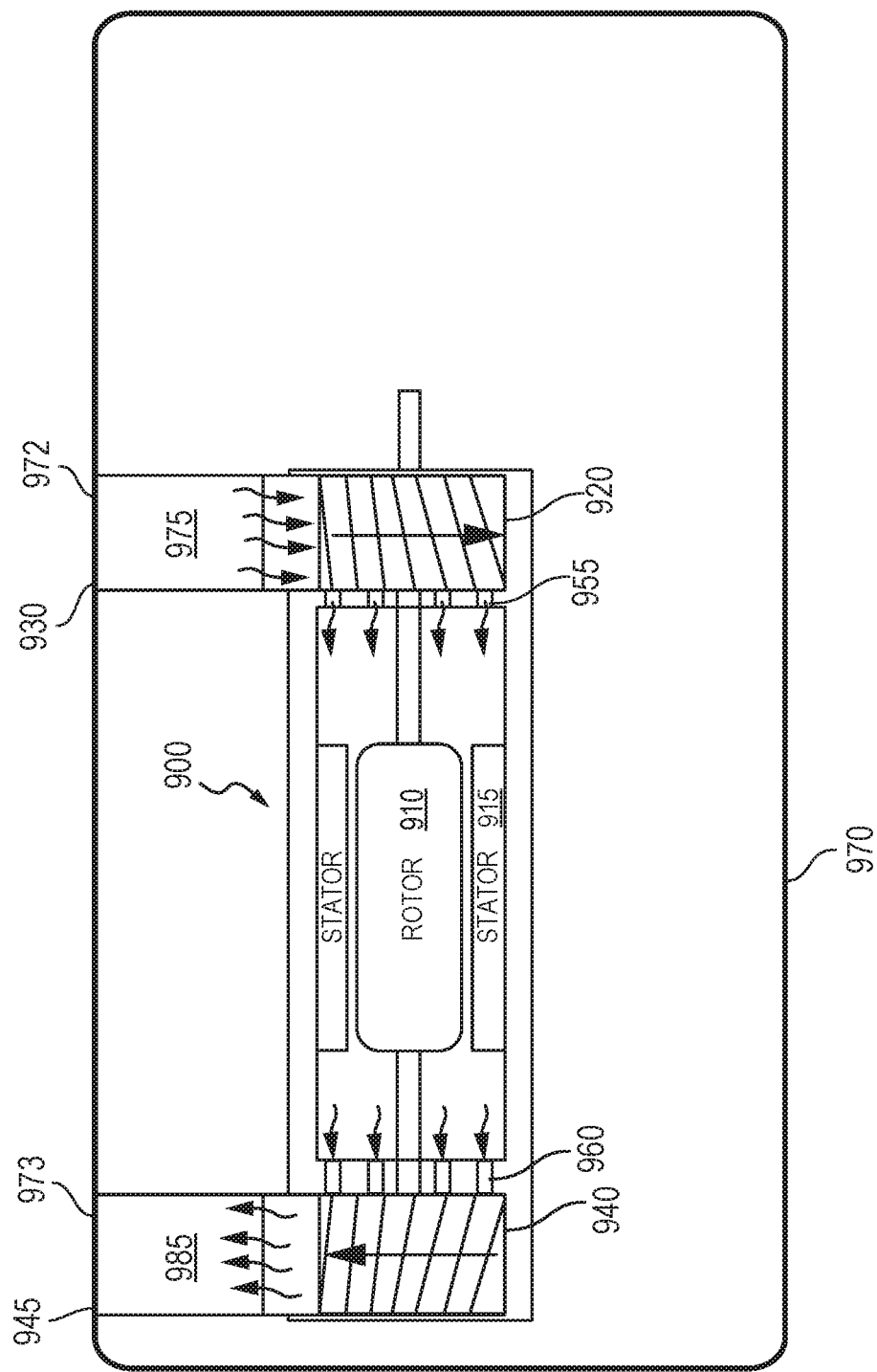
FIG. 9 is a graphical illustration of an embodiment of a shredder motor cooling apparatus as in FIG. 7, disposed in communication with a paper shredder exterior, in accordance with the teachings of the present invention.

Turning to FIG. 9, a motor 900, such as motor 700, can be seen positioned in paper shredder housing 970, having an air input duct 975 and an air output duct 985 disposed in housing 970. Air input duct 975 can communicate with input vent holes 955; air output duct can communicate with output vent holes 960. In this configuration, the intake air manifold opening 930 is positioned on the exterior of shredder housing 970, and communicates with air input duct 975, preventing internal shredder debris from being drawn into motor 900. Similarly, output air manifold opening 945 is disposed at the exterior of shredder housing 970, and in communication with air output duct 985, so that the forced air from 900 does not cause the creation of a debris cloud by exhausting air onto the shreddant (not shown), which may be in or near housing 970. Air input duct 975 or air output duct 985, or both, may be positioned such that human access to input fan 920 or output 940 is difficult. Screen 972, 973 may be placed over one or both external openings 930, 945. In certain embodiments, motor 900 is disposed in the interior of shredder housing 970, without direct communication with the exterior of shredder housing 970. The heat removed from motor 900 is increased over present paper shredder motors due to the increased forced air mass flow rate passing by the motor elements. As with FIG. 1, an axial or a centrifugal fan assembly may be used.

Figure 10:
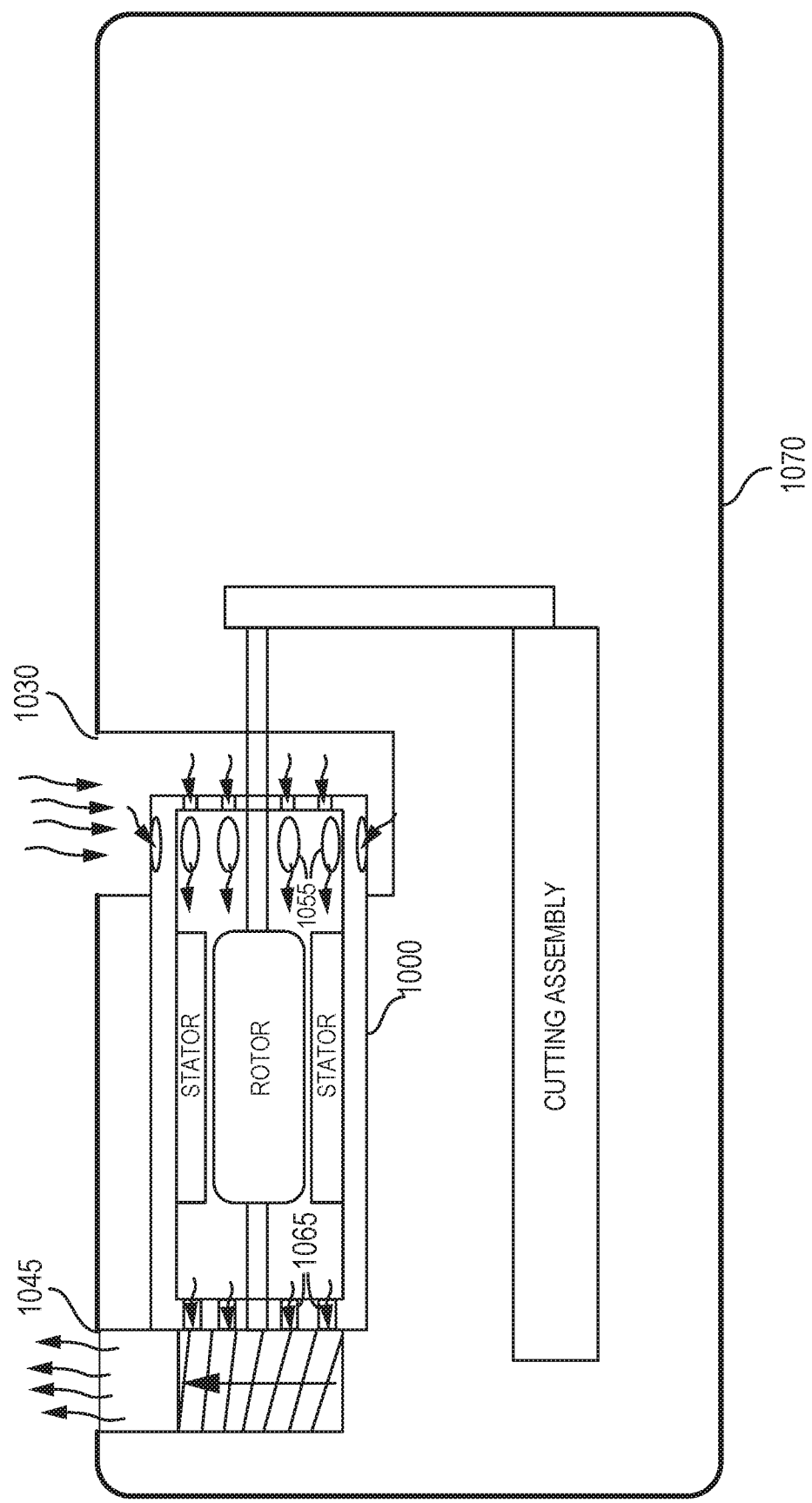
FIG. 10 is a graphical illustration of an embodiment of a shredder motor cooling apparatus as in FIG. 8, disposed in communication with a paper shredder exterior, in accordance with the teachings of the present invention.

In FIG. 10, a single-fan motor 1000, similar to motor 800, is shown in communication with exterior 1008 of paper shredder housing 1010. Similar to FIG. 9, the input air flow and output air flow is routed through ducts 1032, 1044 which are in communication with airflow manifold openings 1030, 1045. In FIG. 10, air is extracted from motor 1000. It should be noted that forced air fan 1040 which, in the example of FIG. 10, is disposed on the outlet side of airflow, may instead be disposed on the input side of airflow. In the latter configuration, the forced air fan may be positioned to insufflate air into the motor 1000 instead of extracting air from motor 1000. In either case, a forced differential air pressure causes a large volume of air to be moved past motor 1000. In still another embodiment, cooling fans may be located on the motor air input and the motor air output. The heat removed from motor 1000 is increased over present paper shredder motors due to the increased forced air mass flow rate passing by the motor elements. Air can be taken in through manifold opening 1030 and then through selected input vent holes 1055. Air can be exhausted through selected output vent holes 1065 and out through manifold opening 1045. As with FIG. 7 or FIG. 8, an axial or a centrifugal fan assembly may be used.

The embodiments of the present invention disclosed herein are intended to be illustrative only, and are not intended to limit the scope of the invention. It should be understood by those skilled in the art that various modifications and adaptations of the prevent invention as well as alternative embodiments of the prevent invention may be contemplated or foreseeable. It is to be understood that the present invention is not limited to the sole embodiments described above, but encompasses any and all embodiments within the scope of the following claims.

What is claimed is:

1. A paper shredder motor cooling assembly, comprising:
   a paper shredder motor having a motor rotor shaft mechanically coupled to a fan shaft;
   an enclosure fitting over the paper shredder motor and having selected input vents and selected output vents disposed to control airflow to the paper shredder motor; and
   a blower input fan and a blower output fan each coupled to the motor rotor shaft and in respective fluid communication with the selected input vents and the selected output vents in the enclosure,
   wherein when the paper shredder motor is operating, the motor rotor shaft turns the fans to generate a differential air pressure between the selected input vents and the selected output vents,
   wherein heat is removed from the motor, and
   wherein a duty cycle of greater than 50% is obtained thereby.

2. The paper shredder motor cooling assembly of claim 1, wherein the input fan insufflate air into the input vents and across the motor.

3. The paper shredder motor cooling assembly of claim 1, wherein the output fan extracts air through the output vents and across the motor.

4. The paper shredder motor cooling assembly of claim 1, further comprising:
   a reduction gearing coupled to the paper shredder motor;
   a shredder blade shaft coupled to the reduction gearing;
   a speed increasing gearing coupled to the shredder blade shaft; and
   the fan shaft is coupled to the speed increasing gearing, wherein the rotational speed of the fan is greater than the rotational speed of the paper shredder motor.

5. The paper shredder motor cooling assembly of claim 4, further comprising:
   a fan tube fluidly coupled to the fan and the selected motor inlet vents, the fan tube directing a forced air current to the motor from the fan.

6. The paper shredder of claim 1, wherein the fan assembly further comprises:
   the paper shredder motor having the motor rotor shaft mechanically coupled to a second fan shaft opposite the first fan shaft;
   an enclosure fitting over the paper shredder motor and having selected input vents and selected output vents disposed to control airflow to the paper shredder motor;
   a second fan coupled to the second fan shaft and in communication with the selected input vents and the selected output vents in the enclosure,
   wherein when the paper shredder motor is operating, the shredder motor rotor shaft turns the fans to generate a differential air pressure between the selected input vents and the selected output vents.

* * * * *